(12) United States Patent
Stahlberg (10) Patent No.: US 8,863,085 B1
(45) Date of Patent: Oct. 14, 2014

(54) MONITORING WEB APPLICATIONS

(75) Inventor: Patrick Stahlberg, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 355 days.

(21) Appl. No.: 13/362,885

(22) Filed: Jan. 31, 2012

(51) Int. Cl.
*G06F 9/44* (2006.01)

(52) U.S. Cl.
USPC ............ 717/124; 717/125; 717/127; 717/135

(58) Field of Classification Search
CPC ............ G06F 11/3688; G06F 11/3664; G06F 11/3466
See application file for complete search history.

(56) References Cited

U.S. PATENT DOCUMENTS

| | | | |
|---|---|---|---|
| 7,698,688 B2 * | 4/2010 | Fujiwara et al. | 717/126 |
| 8,332,821 B2 * | 12/2012 | Low et al. | 717/124 |
| 8,392,890 B2 * | 3/2013 | Miller | 717/127 |
| 8,490,059 B2 * | 7/2013 | Huang et al. | 717/125 |
| 8,589,881 B2 * | 11/2013 | Park et al. | 717/124 |
| 2002/0097268 A1 * | 7/2002 | Dunn et al. | 345/760 |
| 2004/0205565 A1 * | 10/2004 | Gupta | 715/513 |
| 2005/0268288 A1 * | 12/2005 | Nattinger | 717/125 |
| 2011/0252404 A1 * | 10/2011 | Park et al. | 717/124 |
| 2011/0289489 A1 * | 11/2011 | Kumar et al. | 717/135 |
| 2013/0086554 A1 * | 4/2013 | Huggins | 717/124 |

OTHER PUBLICATIONS

Collins et al., Crossfire: multiprocess, cross-browser, open-web debugging protocol, Oct. 2011, 9 pages.*
Artzi et al., A framework for automated testing of javascript web applications, May 2011, 10 pages.*
Vasar et al., Framework for monitoring and testing web application scalability on the cloud, Aug. 2012, 8 pages.*

* cited by examiner

*Primary Examiner* — Thuy Dao
(74) *Attorney, Agent, or Firm* — Sterne, Kessler, Goldstein & Fox P.L.L.C.

(57) ABSTRACT

Methods, systems, and apparatuses for monitoring web applications are provided. An exemplary method for monitoring a web application includes executing a first test on a first browser residing on a server. The exemplary method also includes executing a second test on a second browser residing on the server. The first and second browsers are heterogeneous browsers and run in heterogeneous browser environments.

21 Claims, 11 Drawing Sheets

| Tester | Overview | |
|---|---|---|
| | Service | Service 308 |
| Service 304 | Test name | Test 2 |
| Service 308 | Browser | Second Browser-OS 1 |
| Service 312 | Time | Mon May 9 07:34:23 2011 |
| Service 316 | Status | PASSED |
| | Description | Simulates a typical search session using the first instant. This involves several searches, one search result click and several Suggest completions. The 'newyork' version performs searches around the New York Times sites. |
| | Tester host (shard) | tudb40 (3) |

Test Framework Log
Running: `<a href=/testz/data/Service308/tests/web/production/first_session_newyork.html target=_blank>testz/data/Service308/tests/web/production/first_session_newyork.html</a>`
== loaded #17:58:01 (0.081s)
Ignoring non-synthetic mouse move events.
line 18: run(arg1)
line 20: run(arg2, ' / ')
-- loading: `<a href=/ target=_blank>/</a>` . . .
-- in this1.js:
line 20: run(arg3, msg)
610 ──── ######## Typing "new", making sure that "news" is suggested. ########
-- in firstSession.js:
line 261: run(arg4, arg5)
-- in first_session_newyork.html:
line 25: run(arg6, arg7, /news/)
Ignoring non-synthetic mouse move events.

MONITORING WEB APPLICATIONS

BACKGROUND

1. Field

This disclosure generally relates to monitoring applications over a network.

2. Background

Today, web pages include interactive features allowing users to interact and collaborate with each other. These web pages may include client-side code to be executed in a browser. Different browsers and systems are available for Internet users. Consequently, browser-interpreted code may execute in a diverse set of environments. For example, the client-side code may be executed in different browsers, operating systems, and computing devices (e.g., tablets, smartphones, and desktops). Further, browsers exist with many different configurations, language settings, types, and versions. These differences may result in problems at the client that are not detectable by a conventional monitoring system. For example, the code may break on one system and not on other systems.

Web applications are increasingly susceptible to outages caused by faulty code executed in a browser. The code may fail in ways ranging from minor malfunctions to complete outages of the web application. These outages are not detectable using traditional production monitoring. For example, white box monitoring is a traditional approach to monitoring web applications. White box monitoring monitors key metrics at the server and looks at internal variables within the server to ensure that metric expectations are satisfied. Many outages occurring at the browser do not affect the monitored metrics. Consequently, these outages are difficult to detect by an administrator of the web application's serving system when traditional production monitoring is used. This leads to unnecessary service unavailability resulting from a long time-to-detection because administrators rely on users to manually report the outage.

BRIEF SUMMARY

This disclosure generally relates to monitoring applications over a network. An exemplary method for monitoring a web application over a network includes executing a first test in a first browser residing on a server. Executing the first test includes sending a first command to the first browser to perform a first operation. Executing the first test may also include, executing, in the first browser, first client-side code included in a first response responsive to the first operation. Executing the first test may further include determining a status of the first test based at least on the first response and a result of the executed first client-side code.

The exemplary method also includes executing a second test in a second browser residing on the server. Executing the second test includes sending a second command to the second browser to perform a second operation. Executing the second test may also include, executing, in the second browser, second client-side code included in a second response responsive to the second operation. Executing the second test may further include determining a status of the second test based at least on the second response and a result of the executed second client-side code. The first and second browsers are heterogeneous browsers.

Other embodiments of these aspects include corresponding systems, apparatuses, and computer program products configured to perform the actions of these methods, encoded on computer storage devices.

Further features and advantages of embodiments described herein, as well as the structure and operation of various embodiments, are described in detail below with reference to the accompanying drawings. It is noted that the embodiments described below are not limited to the specific embodiments described herein. Such embodiments are presented herein for illustrative purposes only. Additional embodiments will be apparent to persons skilled in the relevant art based on the teachings contained herein.

BRIEF DESCRIPTION OF THE DRAWINGS/FIGURES

Embodiments are described with reference to the accompanying drawings. The accompanying drawings, which are incorporated herein and form a part of the specification, illustrate embodiments and, together with the description, further serve to explain the principles of the embodiments and to enable a person skilled in the relevant art to make and use the embodiments. In the drawings, like reference numbers may indicate identical or functionally similar elements. The drawing in which an element first appears is generally indicated by the left-most digit in the corresponding reference number.

DETAILED DESCRIPTION

I. Overview
II. System Architecture
III. Example Application Monitoring System
  A. Test Execution
  B. Example Heterogeneous Browser Environments
    1. First Example Environment
    2. Second Example Environment
  C. External Programs
  D. Session-Oriented Tests
  E. Production Traffic Monitoring
IV. Replication
V. Example Screenshots
VI. Exemplary Methods
VII. Conclusion

I. OVERVIEW

This description generally relates to monitoring applications over a network. An application monitoring system may execute tests in browsers residing in heterogeneous browser environments.

In the detailed description that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

The following detailed description refers to the accompanying drawings that illustrate exemplary embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which the present disclosure would be of significant utility. Therefore, the detailed description is not meant to limit the embodiments described below.

II. SYSTEM ARCHITECTURE

Figure 1:
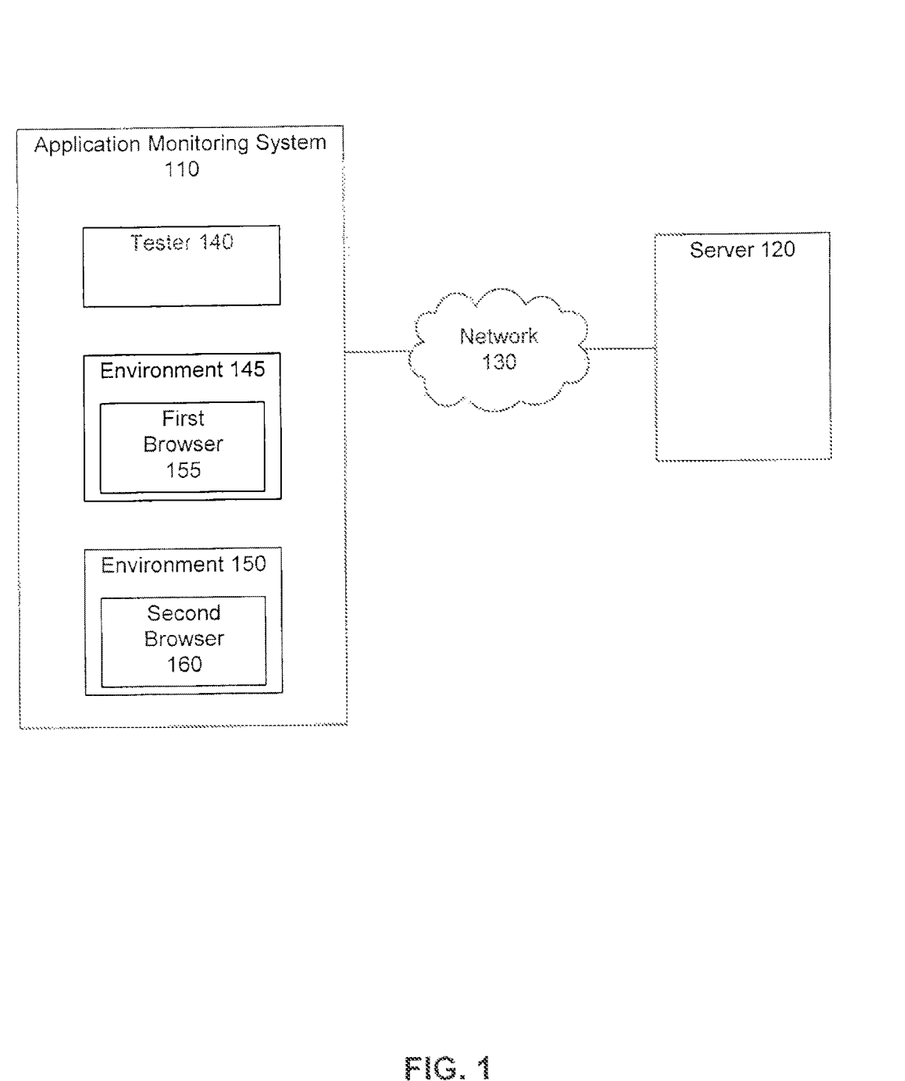
FIG. 1 shows an example communication system which relates to embodiments.

FIG. 1 shows an example communication system 100 which relates to embodiments. System 100 includes an application monitoring system 110 that is communicatively coupled to a server 120 via a network 130. Although system 100 is described herein with reference to one application monitoring system and one server, one of skill in the art will recognize that system 100 may include more than one application monitoring system and more than one server without departing from the spirit and scope of the present disclosure. Further, system 100 is described as having two heterogeneous browsers and two heterogeneous browser environments. One of skill in the art will recognize that system 100 may include more than two heterogeneous browsers and more than two heterogeneous browser environments without departing from the spirit and scope of the present disclosure.

Server 120 may include a web application that users may access over a network (e.g., network 130). A user may use a client browser to send a request to server 120, such as a request for a web page, over network 130. Server 120 may receive the request and return a response, such as content for the requested web page. The web page may be an HTML document that includes client-side code to be executed in the browser. The client-side code can be, for example, Java Script code.

Application monitoring system 110 includes a tester 140, environment 145, and environment 150. Application monitoring system 110 can monitor a web application by executing tests to ensure that the client-side code is compatible with and does not break the browser. In an embodiment, application monitoring system 110 is a server that runs programmatically controlled browsers that execute client-side code included in a response from the server. The controlled browsers may exchange messages with one or more servers (e.g., server 120) that user-controlled browsers would exchange.

Tester 140 controls the flow of executing tests in a browser. A first browser 155 resides in environment 145 and a second browser 160 resides in environment 150. First browser 155 and second browser 160 are heterogeneous browsers, and environments 145 and 150 are heterogeneous browser environments.

Tester 140 communicates and executes tests in browsers residing in environments 145 and 150. In an embodiment, tester 140 is run in a virtual machine that supports testing heterogeneous browsers residing in environments 145 and 150. Tester 140 may test different browser and operating system combinations. In an embodiment, application monitoring system 110 runs a first set of browsers natively on a first operating system and runs a second set of browsers in a virtual machine running a second operation system, different from the first operating system. In this embodiment, the first browser runs on a first operating system, the second browser runs on a second operating system, and the first operating system is different from the second operating system.

Application monitoring system 110 may run tests against a production environment. In an embodiment, application monitoring system 110 is a server, in a data center, that includes a set of virtual machines running interactive tests against production Web services. For example, tester 140, first browser 155, and second browser 160 may run in a production environment. Running browsers in production environments (e.g., on servers in data centers) is typically more complex than running browsers on end-user desktop workstations, because browsers are designed to run on end-user desktop workstations and not on servers. For example, servers typically do not have attached displays and browsers typically expect to have attached displays. Further, many servers run operating systems that are incompatible with the operating systems that end-users commonly run. Application monitoring system 110 accounts for these differences. By simulating the heterogeneity of real browsers, application monitoring system 110 has a higher likelihood of catching code breakage compared to other web application monitoring systems.

In an embodiment, tester 140, first browser 155, and second browser 160 run on a single machine (e.g., application monitoring system 110). In this way, network traffic and complexity may be reduced and difficulties in change management may be mitigated.

A computer system typically has active processes and threads. A process is the execution of a program and may have a self-contained execution environment. Each process has one or more threads. A thread is code that may be executed within a process. Multiple threads may exist within the same process and share resources such as memory.

Several different processes may run on components in FIG. 1. For example, a first process may run on tester 140, a second process may run in environment 145 and simulate a machine, and a third process may run in environment 150 and simulate a machine. In another example, tester 140 may be a virtual machine that runs as a normal application inside an operating system and supports a single process.

In an embodiment, tester 140 is the main binary that is run to monitor a web application. Tester 140 may be written in any programming language. For example, tester 140 may be a Python application that coordinates and controls test runs to monitor a web application.

Network 130 can be any network or combination of networks that can carry data communication, and may be referred to herein as a computer network. Such network 130 can include, but is not limited to, a wired (e.g., Ethernet) or a wireless (e.g., Wi-Fi and 3G) network, a local area network, medium area network, and/or wide area network such as the Internet. Network 130 can support protocols and technology including, but not limited to, World Wide Web protocols and/or services. Intermediate web servers, gateways, or other servers may be provided between components of communication system 100 depending upon a particular application or environment.

III. EXAMPLE APPLICATION MONITORING SYSTEM

Figure 2:
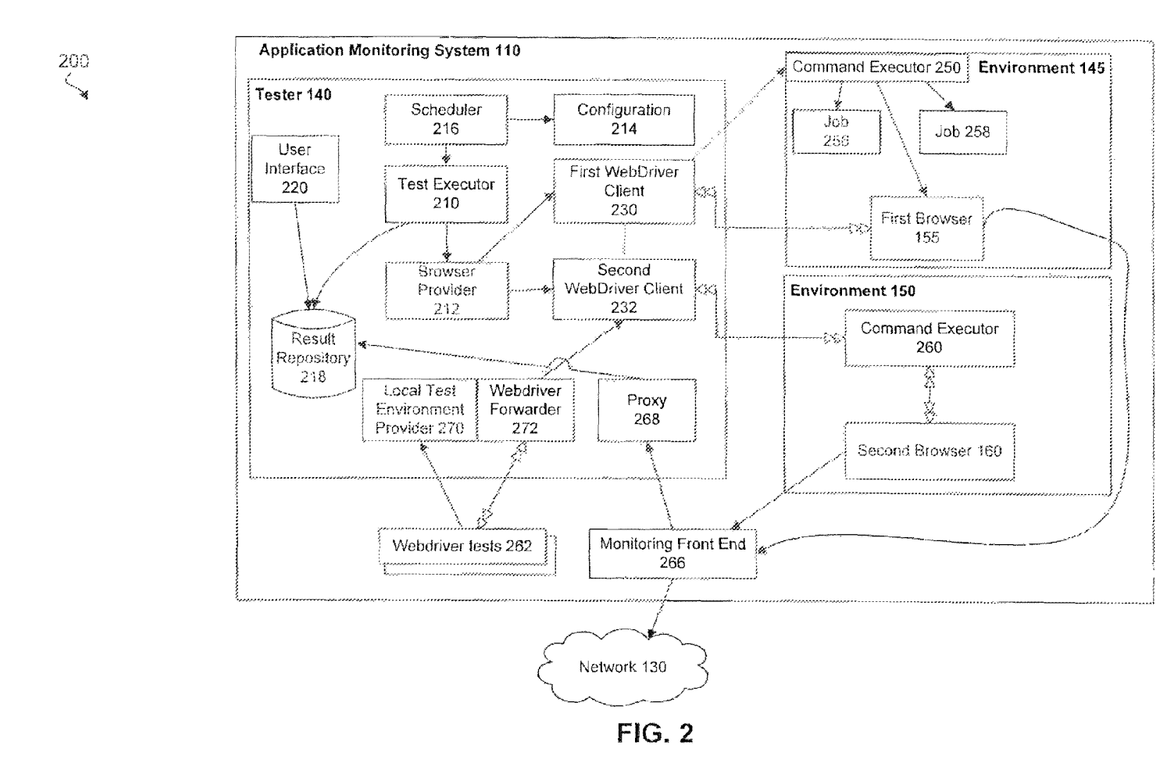
FIG. 2 shows an example system for monitoring a web application, according to an embodiment.

FIG. 2 shows an example system 200 for monitoring a web application, according to an embodiment. System 200 includes an application monitoring system 110 that communicates over network 130.

A. Test Execution

Application monitoring system 110 includes a tester 140. Tester 140 includes a test executor 210 that controls the flow of executing individual tests in a controlled browser. Executing a test in a browser residing on a server may include sending a command to the browser to perform an operation, executing, in the browser, client-side code included in a response responsive to the operation, and determining a status of the test based at least on the response and a result of the executed client-side code. There may be several rounds of communication between the browser and the server.

Test executor 210 instructs a browser provider 212 to start up or communicate with a particular browser residing in environments 145 or 150. Test executor 210 can send a command to first browser 155 or second browser 160 to perform an operation using browser provider 212. The command can simulate a user action or operation. A user may interact with a web page by performing operations such as starting a browser, pointing the browser to a Uniform Resource Locator (URL), displaying the web page located at the URL, scrolling around the web page, selecting an item on the web page, sending a keyboard command to perform actions or to fill out a form (e.g., a search box), or other user operations. Similarly, test executor 210 can send a command to first browser 155 or second browser 160 to perform any of these operations or other operations.

Test executor 210 may determine a status of the test (e.g., success, failure, partial failure, and service degradation). For example, test executor 210 may communicate with a browser to determine whether a test finished. Based on a result of the test, test executor 210 may determine whether the test passed or failed. Additionally, test executor 210 may gather debugging data about the test. In an example, test executor 210 communicates with the browser to obtain logs about the testing process. A log may be very detailed and show in which step the test failed. For example, a log may be a step-by-step collection of the events that occurred during the test. Tester 140 may export the logs of each test run.

Test executor 210 may be implemented in a number of ways. According to an embodiment, test executor 210 executes tests by finding the Java binary that belongs to the test and executing it. The test may be, for example, on the local disk. Test logs can be extracted and a status of the test can be determined by the test's exit code.

According to another embodiment, test executor 210 navigates a browser to a URL of a test to be executed. The test file can be loaded into the browser and executed automatically. This test may run automatically when the code executing the test is, for example, JavaScript code. Once the test executes, test executor 210 may retrieve the test result in a number of ways.

In one example, a test result is determined by inspecting the browser's Document Object Model (DOM) for a particular DOM element. The presence of this DOM element may indicate that the test completed and the contents may indicate a status of the test. The log can be extracted from the browser's DOM.

In another example, a test result is determined by instructing the testing framework to send out logs of its progress via special requests to a monitoring front end 266. Monitoring front end 266 may be configured to forward these requests to a proxy 268. The requests pass through monitoring front end 266 to test executor 210. Test executor 210 may process the requests and determine the test outcome. In this example, the logs may be provided to test executor 210 without being extracted from the browser's DOM.

Browser provider 212 starts up and communicates with browsers residing in environments 145 and 150. In an embodiment, browser provider 212 provides a browser that can execute client-side code to, for example, monitor a web application. Browser provider 212 may be an abstract interface in which test executor 210 can request a type of browser. For example, test executor 210 may send a request to browser provider 212 to start up a particular browser running on a particular operating system. After receiving the request, browser provider 212 launches the particular browser on the particular operating system. Once the particular browser is launched, test executor 210 can execute a test in the browser by using browser provider 212 to send a command to the browser to perform an operation. After a test completes, browser provider 212 may terminate processes started and remove temporary files created as a result of the test execution.

Tester 140 also includes configuration 214, scheduler 216, and result repository 218. Configuration 214 manages the configured list of tests. For example, configuration 214 may store a database of these tests, instructions on how to run them, and a timeline for when these tests are executed. In an embodiment, configuration 214 manages the list of tests by reading a text file from local disk.

Scheduler 216 determines when and in which order to run tests. Scheduler 216 may select the appropriate test to run and instruct test executor 210 to run that test. Scheduler 216 may use a variety of scheduling algorithms. For example, scheduler 216 may run all configured tests in a round-robin fashion. Other scheduling algorithms may also be used.

If a test fails, scheduler 216 may implement a special scheduling algorithm. In an embodiment, scheduler 216 automatically re-executes tests that fail. Scheduler 216 may execute failing tests more often to gain more confidence about whether the test is failing consistently. Determining whether a test has failed may depend on factors such as how quickly scheduler 216 can detect failure (e.g., 1-10 seconds), how many times a test must have executed before it is determined to have failed (e.g., 8, 10, or 12 times), and a minimum ratio of test executions that must have failed before the test is determined to have failed.

Scheduler 216 may enforce a policy guaranteeing that only one test executes at any given time for each process running on tester 140. The scheduling of tests may be divided into a number of partitions called "shards." One or more tests may be executed across a set of shards based on a function. In an embodiment, scheduler 216 supports modulo-sharding. This may ensure that tests are distributed across many tasks without any interaction between the individual tasks.

Result repository 218 stores a list of previous test attempts and their results. The list may be ordered. Result repository 218 may also store statistics on test executions and metadata associated with previous test executions. Metadata may include, for example, details of the test (e.g., name, operating system, and browser version), the test URL, a status of the test (e.g., passed or failed), a number of attempted test executions, when the test executed, timing information (e.g., a total time spent executing each test), a number of test attempts that failed, a number of test attempts that succeeded, a timestamp of the last test success, and debugging output of the test.

Some data to be stored in result repository 218 may be kept in memory while other data to be stored in result repository 218 may be written to disk as soon as the test completes. In an embodiment, the test URL, browser and operating system used, and a status of the test (e.g., pass or fail) is kept in memory, and screenshots and HTTP logs are written to disk as soon as the test completes.

A monitoring system may monitor data in result repository 218 and generate alerts based on the data. In an embodiment, tester 140 exports data in result repository 218 to, for example, an external monitoring system that keeps track of test executions on multiple servers. For example, statistics on test runs may be exported to the external monitoring system. The exported data may be high-level data and may contain, for example, which tests were executed, when the tests last executed, and how many times the tests were executed.

In an embodiment, when it is determined that a test has previously succeeded, a first counter associated with the test is incremented. The first counter keeps track of a number of times the test has previously succeeded. When it is determined that the test has previously failed, a second counter associated with the test is incremented. The second counter keeps track of a number of times the test has previously failed. When the second counter exceeds a threshold, an alert is generated. Based on the data, a monitoring system can determine whether a test is failing too often and whether to generate an alert. An alert may generate a page to, for example, a systems administrator or to a team of people responsible for monitoring the web application.

A user may access data in result repository 218 via a user interface 220. A browser may display data in result repository 218 to the user. For example, a browser may display in a web page screenshot the debugging output of a test at the end of the test or the logs of the HTTP network traffic caused by the browser during test execution. Further, data in result repository 218 may be used to generate historical graphs. For example, a report on the number of tests executed over a specified time period (e.g., the past couple of days or weeks) and how often tests are failing can be generated.

B. Example Heterogeneous Browser Environments

Tester 140 communicates and executes tests in browsers residing on application monitoring system 110. Tester 140 includes webdriver clients that communicate with heterogeneous browsers residing in heterogeneous browser environments 145 and 150. Tester 140 includes a first webdriver client 230 and a second webdriver client 232. Browser provider 212 communicates with first browser 155 via first webdriver client 230 and communicates with second browser 160 via second webdriver client 232.

1. First Example Environment

Environment 145 includes a command executor 250, jobs 256 and 258, and first browser 155. In an embodiment, application monitoring system 110 and first browser 155 run on the same operating system.

In an embodiment, first browser 155 runs natively on a particular operating system. For example, first browser 155 may run natively on a UNIX operating system. The chroot environment in UNIX simulates a virtual UNIX environment that may be configured differently from the host environment. Accordingly, heterogeneous browsers depending on different system configurations may be run on the same machine. The chroot environment may isolate directory structures from each other and be used to create a separate tree (e.g., a virtual tree) that only command executor 250 can access.

Command executor 250 may be a binary that provides a remote procedure call server interface allowing tester 140 to execute commands inside environment 145. A separate process may be run to control first browser 155 and execute commands.

Job 256 enables access to environment 145 for debugging purposes via a protocol (e.g., Virtual Network Computing protocol), and job 258 provides a server interface for first browser 155. Jobs 256 and 258 may simulate to first browser 155 that a display is present on application monitoring system 110. As described, application monitoring system 110 may be a server running in a big data center and may not have an actual display or keyboard attached. Job 256 may display a browser window in first browser 155, and job 258 may store the content displayed in the browser window to be used later to obtain a screenshot.

First browser 155 may run in a virtual operating system. By running first browser 155 in a virtual operating system, it may be unnecessary to install first browser 155 on the production machine. This may be advantageous because an application monitoring team may not have permission and privileges to install first browser 155 on the production machine.

In an embodiment, first browser 155 is a particular browser and first webdriver client 230 is a driver for the browser. A special subclass of a webdriver client library may be used that injects a custom implementation of a specific webdriver protocol for the browser. Browser provider 212 may include logic to use command executor 250 to launch the browser and any necessary auxiliary processes inside environment 145.

2. Second Example Environment in the above example environment, application monitoring system 110 and environment 145 run on Unix. Application monitoring system 110 may run on an operating system that is incompatible with operating systems that end users use. It may be desirable to monitor web applications using browsers that end users use. Application monitoring system. 110 may leverage virtual machine technology to run a browser that is incompatible with the operating system of application monitoring system 110.

A process may run and simulate a machine in environment 150. In an embodiment, environment 150 is a virtual machine, and a browser runs in an operating system residing in the virtual machine.

Environment 150 includes a command executor 260 and second browser 160. Application monitoring system 110 and second browser 160 may run on different operating systems. In an embodiment, tester 140 resides in a first virtual machine and command executor 260 resides in a second virtual machine, different from the first virtual machine.

Command executor 260 starts and controls second browser 160 and allows networking protocols to be used to communicate with second browser 160. For example, test executor 210 may send a message (e.g., command) to command executor 260 to instruct it to perform a first operation. Test executor 210 may then send a message to command executor 260 to perform a second operation.

In an embodiment, command executor 260 may automate browsers and test web applications.

Second webdriver client 232 may be a webdriver client library that communicates via a webdriver-specific HTTP protocol with command executor 260. Second webdriver client 232 may be used to start and control browsers running in environment 150. In an embodiment, second webdriver client 232 is the standard Python binding for the webdriver. Tester 140 may subclass some of the classes from that library to extend the functionality and expose more powerful functions. In an embodiment, browser provider 212 includes logic to start up a virtual machine and launch second browser 160 in the virtual machine.

C. External Programs

In an embodiment, tester 140 runs in a virtual machine and test executor 210 executes tests that are not stored in the virtual machine. Application monitoring system 110 may include webdriver tests 262. Webdriver tests 262 communicate with the browser through webdriver forwarder 272. Webdriver tests 262 are external programs that may be written, for example, in the Java programming language. Webdriver tests 262 may be compiled and copied into application monitoring system 110. Test executor 210 may instruct browser provider 212 to communicate with a particular browser and then run webdriver tests 262 on the browser. Running webdriver tests 262 may entail running code that can control the browser outside of the browser. Webdriver tests 262 may allow for out-of-the-box testing and result in a more powerful and realistic testing environment.

Local test environment provider 270 and webdriver forwarder 272 provide webdriver tests 262 with the environment that is needed to run the tests. Local test environment provider 270 provides tests with a pointer to the webdriver interface.

A particular browser may not provide a native interface that implements the protocol to communicate with command executor 260. Using the example environments described above, webdriver forwarder 272 may implement a server-side interface for command executor 260 and forward requests to the server running inside the virtual machine or to the browser driver instance, which will send the commands to the browser.

D. Session-Oriented Tests

Modern web user interfaces use a constant stream of messages between the client and server. For example, when a user navigates to a homepage, the browser sends a request for the homepage to a server. The user may perform an action on the homepage that sends another request to the server. In an example, if the homepage is a web search page, the user can submit a query on the homepage and receive a search results page from the server.

State may be transported between the first web page (homepage) and the second web page (search results page). In an embodiment, the entire second web page is not reloaded in the browser. For example, Java Script code may be used to load additional pieces of information from the server. Java Script code may be downloaded by the homepage and may execute at the client as part of the search results page. Java Script dynamically changes and modifies the existing page rather than completely reloading it. The code breakage typically occurs later than at the initial two messages (e.g., first HTTP request and first HTTP response). A state of a subsequent message may depend on, for example, the first HTTP request and response.

Application monitoring system 110 may have session-awareness between different HTTP transactions. In an embodiment, a complete session representative of a user's behavior is tested. First browser 155 or second browser 160 may communicate with a web application and handle the session awareness and state transfers that a user's actual browser would go through. For example, an executed test represents a set of sessions, and each session may be a sequence of actions that individual users take with their browsers. This may closely mirror user behavior and exercise the core functionality provided by the web application's user interface.

An example session may include the following operations: navigating to a web search homepage, suggesting search queries based on what has already been typed into the search query box, performing a web search of the search query (e.g., by hitting a submit button), and selecting a search result. Another example session may include the following operations: navigating to a homepage, typing a query, and selecting one of the suggestions listed. Another example session may include the following operations: navigating to a web page and selecting an option on the web page.

In an embodiment, test executor 210 executes a test that includes at least two commands that are associated with the same session. A state of the second command may be dependent on a state of the first command. Test executor 210 sends a first command to, for example, first browser 155 to perform a first operation (e.g., request a web page from a server). First browser 155 receives a first response that includes client-side code to be executed in first browser 155 from the server in response to the first operation. An example of client-side code is JavaScript code that can be included in the first response or along with the first response.

First browser 155 executes the client-side code included in the first response. First browser 155 may generate additional requests to the server as a result of executing the client-side code. The server processes the additional requests and returns responses responsive to the requests to first browser 155. In an example, as a user types in a search query into a search query box, the client-side code may cause search queries to be suggested to the user based on what has already been typed into the search query box. For example, if the user enters "apartm" into the search query box, search queries "apartments" and "apartment ratings" may be suggested to the user. Test executor 210 may determine a status of the test based at least on the first response and a result of executing the client-side code included in the first response. For example, a screenshot of the suggested search queries displayed on the web page may be taken to ensure that search queries "apartments" and "apartment ratings" were actually suggested as a result of "apartm" being entered into the search query box.

Test executor 210 then sends a second command to first browser 155 to perform a second operation. The second operation may be dependent on the first operation. Using the above example, the second operation may be selecting one of the suggested search queries displayed on the web page. First browser 155 receives a second response that includes client-side code to be executed in first browser 155 from the server in response to the second operation.

First browser 155 executes the client-side code included in the second response. Test executor 210 determines a status of the test based at least on the first and second responses and results of executing the client-side code included in the first and second responses.

A session log may be generated that includes metadata of the test. The metadata may include a status of the test, a timestamp of the test, a number of attempted test runs of the test, a total time spent executing the test, a number of times the test has previously failed, or a number of times the test has previously succeeded.

E. Production Traffic Monitoring

Application monitoring system 110 may also monitor production traffic. In FIG. 2, application monitoring system includes monitoring front end 266 and proxy 268.

As depicted in FIG. 2, a browser may send requests and traffic to monitoring front end 266. Monitoring front end 266 may perform the following tasks. Monitoring front end 266 may send log traffic and events that occurred as a result of a request to tester 140. Monitoring front end 266 may forward the requests to a public front end coupled to network 130, where the requests will be processed as normal requests. Based on the requests, monitoring front end 266 may generate a log of the network traffic. A user may access the log of network traffic caused by the browser.

Requests from a browser may be redirected to proxy 268. In an embodiment, monitoring front end 266 sends logs of proxied HTTP transactions to tester 140. In an embodiment, all HTTP requests from the browsers are redirected to an HTTP proxy. Proxy 268 may forward some requests (e.g., requests for external domains) to tester 140. Proxy 268 may also maintain a log of the network transactions. The log is available for debugging purposes and may contain, for example, the HTTP headers included in the HTTP transactions.

IV. REPLICATION

Tester 140 may rely on inherently unreliable infrastructure (e.g., operating systems, PCs, browsers). To increase reliability, tests may be replicated on different physical servers and across many data centers. In an embodiment, tester 140 has sharding support to scale across many servers. For example, several processes executing tests may run on different physical servers and across many data centers.

Figure 3:
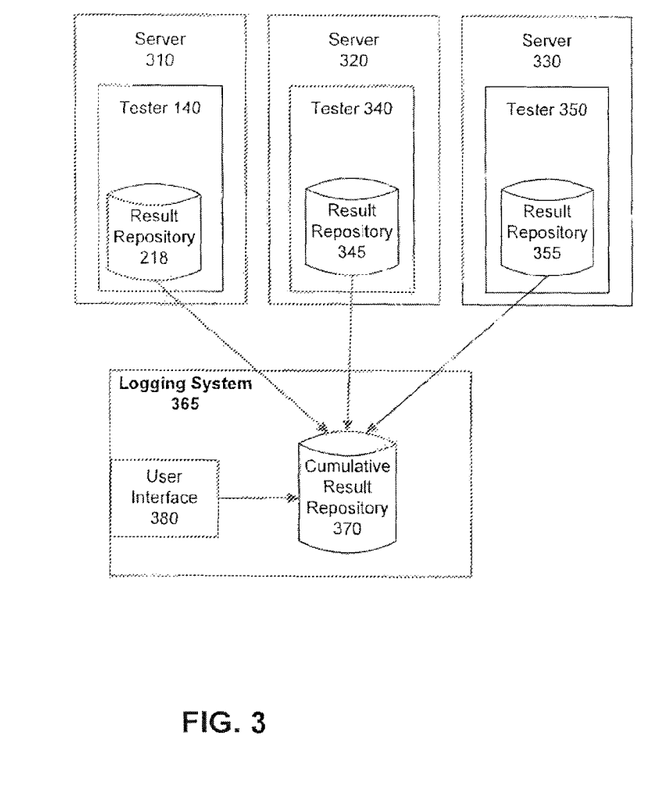
FIG. 3 shows an example system for obtaining test results from different servers, according to an embodiment.

FIG. 3 shows an example system 300 for obtaining test results from different servers, according to an embodiment. System 300 includes servers 310, 320, and 330. Server 310 includes tester 140 and result repository 218, server 320 includes tester 340 and result repository 345, and server 330 includes tester 350 and result repository 355. In an embodiment, servers 310, 320, and 330 are different physical machines and may be in different data centers.

Application monitoring system 110 may be replicated across servers 310, 320, and 330. In an embodiment, tester 140 is replicated across server 320 and/or server 330. For example, a test that tester 140 executes may also be executed by tester 340. In this way, breakages occurring on individual servers may be detected. If a server breaks and all tests executing on that server fail, the same test can be executed on another server such that it can be determined whether the failure of the test is linked to a breakage on the server itself. For example, when a test fails on server 310, the test may be automatically re-executed in server 320. In this way, if there is a problem with server 310, the test can be re-executed in a different server rather than paging an on-call person right away.

In an embodiment, each server runs different tests. In this way, test execution may be faster because tests can be spread across multiple servers compared to a single server.

System 300 includes a logging system 365 that obtains test data from testers 140, 340, and 350. Logging system 365 includes a cumulative result repository 370 and a user interface 380. Logging system 365 stores the collection of test data in cumulative result repository 370. The individual tasks running in testers 140, 340, and 350 show per-shard information. In an embodiment, logging system 365 provides a collection of data of an entire tester 140 instance rather than only per-shard information. This may be beneficial for tester 140 instances that have many replicas.

Logging system 365 may run on a physical server different from servers 310, 320, and 330. A user may access the test data using user interface 380. In this way, the user can access the test data from one machine rather than accessing each of the servers 310, 320, and 330. The system administrator can, for example, use user interface 380 rather than access each of servers 310, 320, and 330 to determine in which server a test failed.

Other embodiments can have more or fewer than three servers, depending on such factors as the complexity of the web application and resources of the system administrator.

V. EXAMPLE SCREENSHOTS

Figure 4:
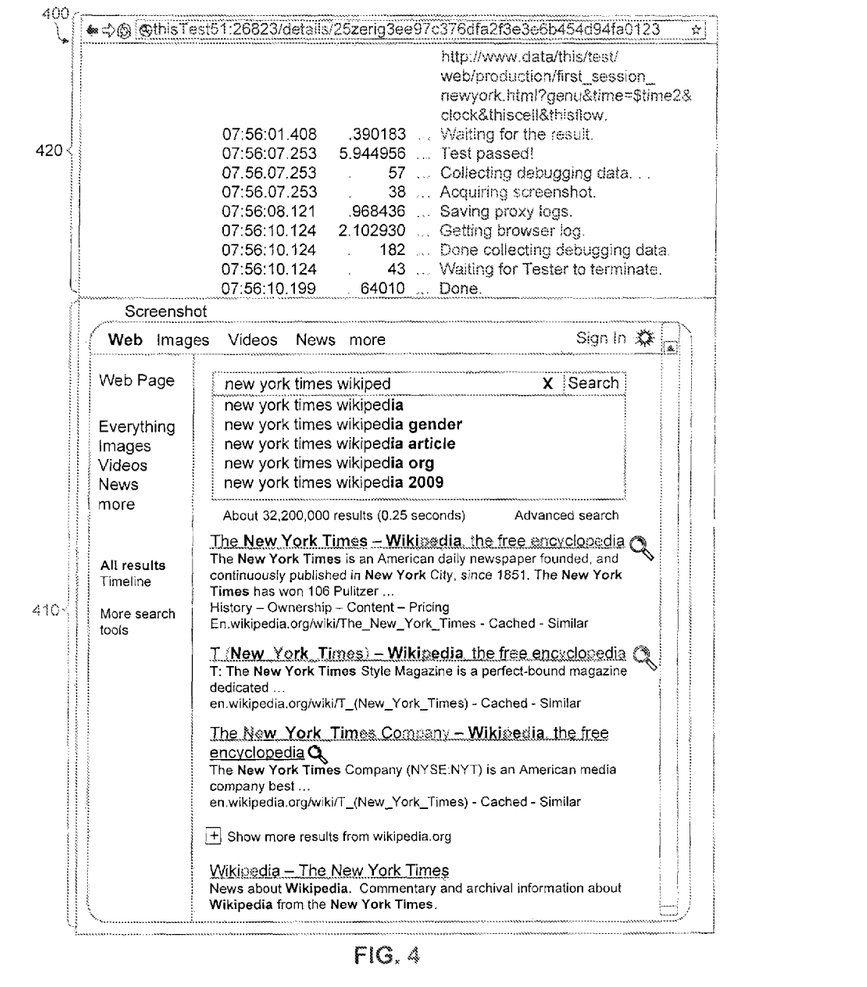
FIG. 4 shows an example screenshot of an operation being performed, according to an embodiment.

FIG. 4 shows an example screenshot 400 of an operation being performed, according to an embodiment.

In this example, test executor 210 instructs a browser to navigate to a search web page and then enter a search query into the web page. A first portion 410 of screenshot 400 shows what is displayed to a user at a particular moment in time. The web page displays suggestions that align with what has been typed into the search query input field at that particular moment in time.

A second portion 420 displays a log of the events that occurred as a result of executing the test. For example, portion 420 shows the test passed after 5.944956 seconds elapsed, debugging data was collected, a screenshot was acquired, proxy logs were saved, and a browser log was retrieved. A user can obtain screenshot 400 via user interface 220.

Figure 5:
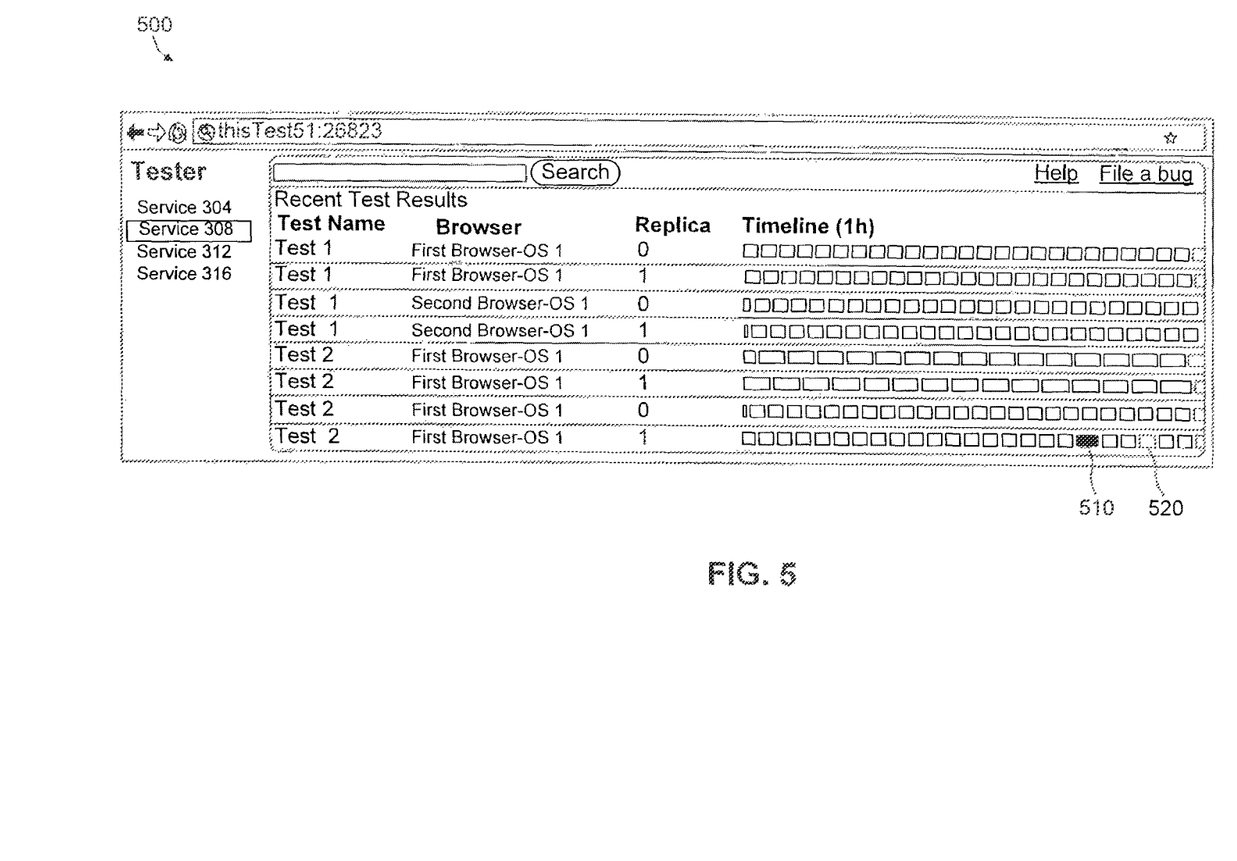
FIG. 5 shows an example screenshot that lists previously executed tests, according to an embodiment.

FIG. 5 shows an example screenshot 500 that lists previously executed tests, according to an embodiment. Screenshot 500 is an overview page that shows a timeline of which tests have executed in the last hour. The most recently executed tests are shown on the right-hand side.

In an embodiment, tester 140 compartmentalizes tests and supports the notion of services. This makes it possible to run tester 140 as a shared service. As shown in FIG. 5, tests may be run for multiple services (e.g., services 304, 308, 312, and 316). Screenshot 500 displays the names of the executed tests (e.g., test 1 and test 2), the browser and operating system configurations (e.g., first browser-OS 1 and second browser-OS 1), and a quantity of test replicas. A box 510 indicates that a test failed and a box 520 indicates that a test passed.

Figure 6:
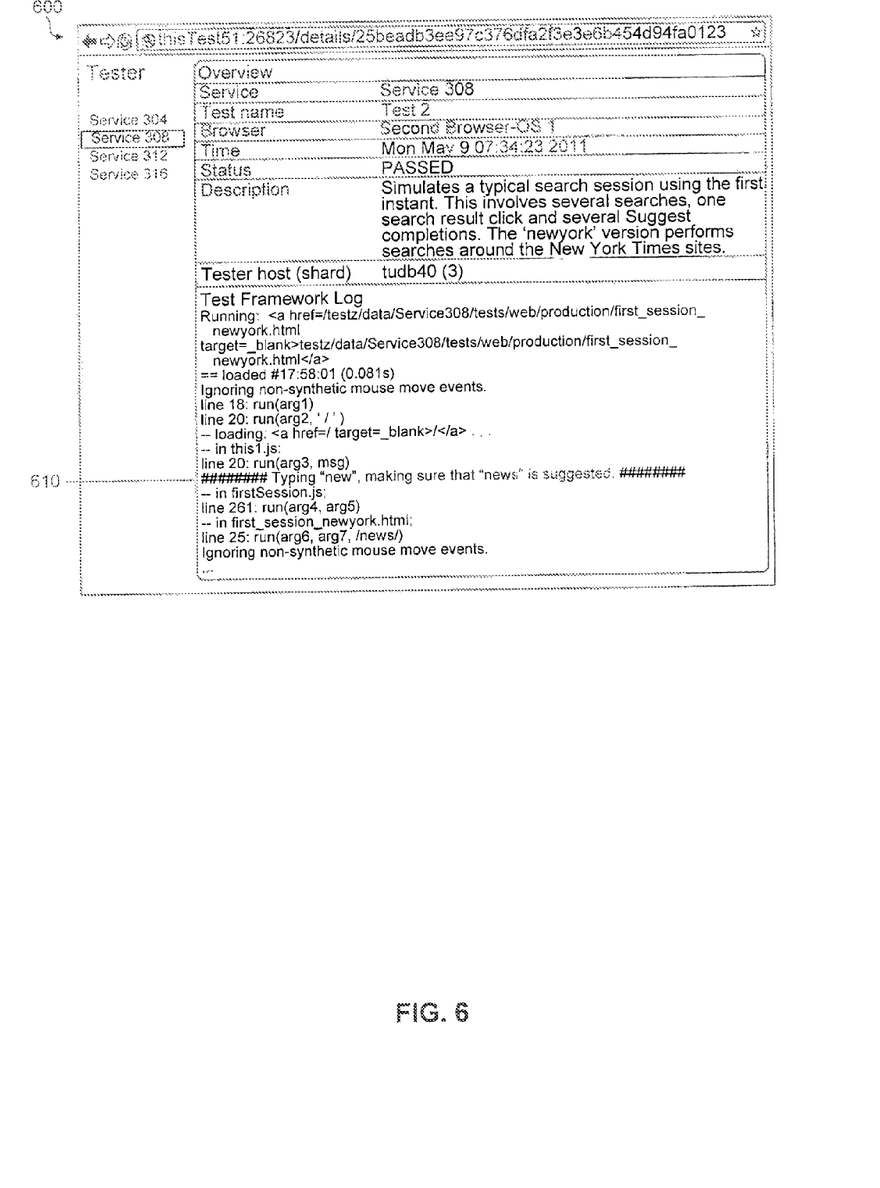
FIGS. 6-8 show example screenshots resulting from previously executed tests, according to an embodiment.
Figure 7:
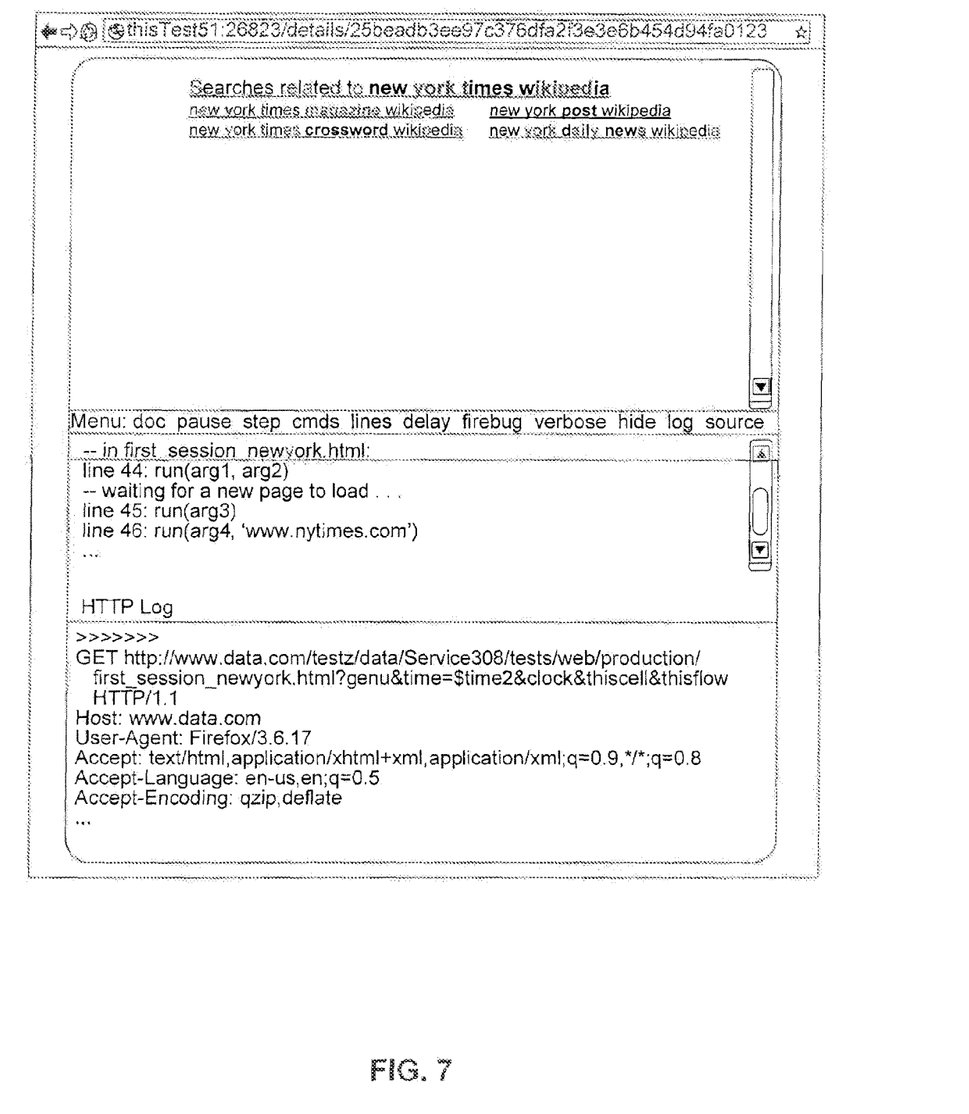
Figure 8:
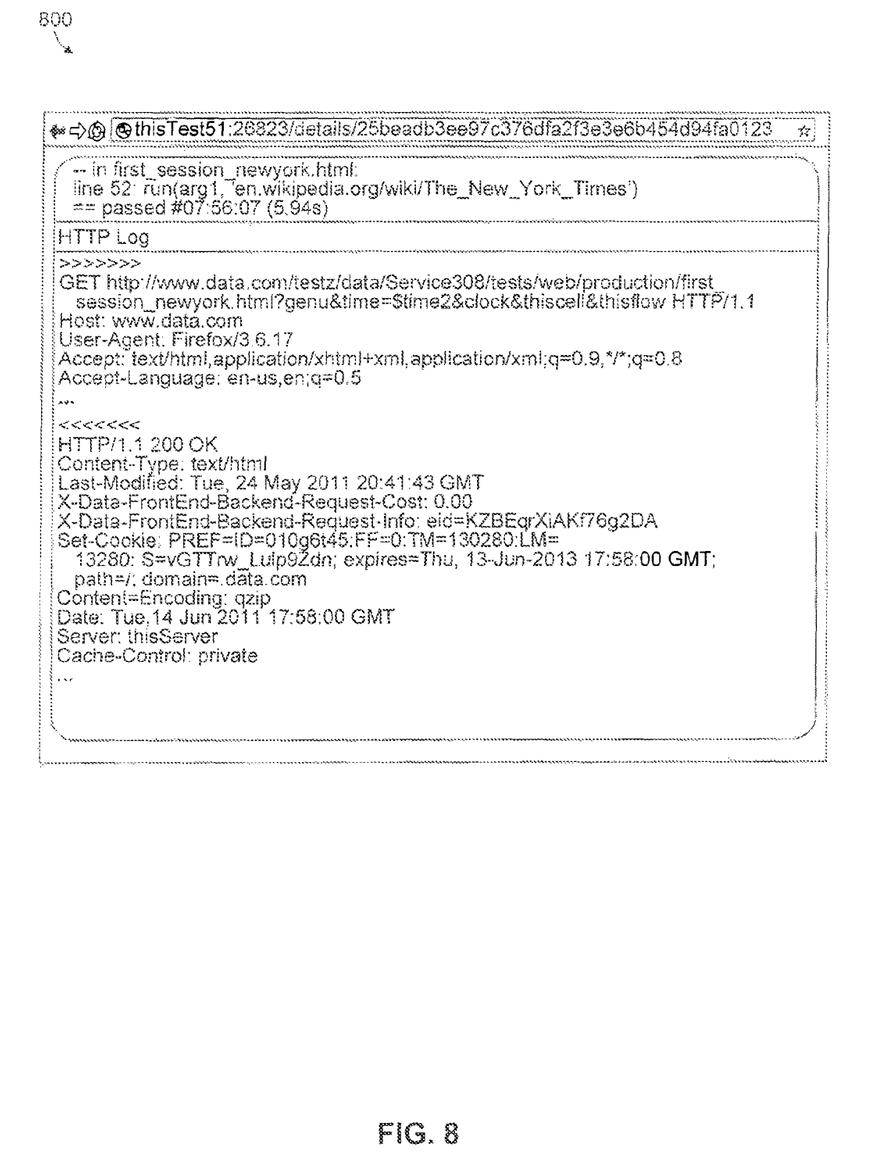

FIGS. 6-8 show example screenshots 600, 700, and 800 resulting from previously executed tests, according to an embodiment. These screenshots show a log of a test that passed and may be displayed, for example, when a user selects box 520. The screenshots can be used by the system administrator charged with monitoring the web application to debug what happened during the test execution.

In FIG. 6, screenshot 600 shows the test executed against service 308 on Monday, May 9, 2011 at 07:34:23 AM. The test name is "Test 2," the browser and operating system configuration is "Second Browser-OS1," and a status of the test is "PASSED." A description of the test is also displayed. The description may help a user understand the purpose of the test. Further, a test framework log is displayed that shows a step-by-step process of the test execution. For example, at line 610, the system checks that when "new" is entered into the search text box, "news" is suggested in the list of suggestions to a user.

FIGS. 7 and 8 show a log file with the headers of the HTTP messages that were part of the test. Screenshot 700 shows a log including HTTP request headers included in a request sent in response to executing a test. As shown in this screenshot, the browser sent a request to host www.data.com. Screenshot 800 shows a log including HTTP request and responses headers that were sent and received in response to executing a test. As shown in this screenshot, the host sent a response to the browser indicating that the request succeeded (HTTP/1.1 200 OK).

VI. EXEMPLARY METHODS

Figure 9:
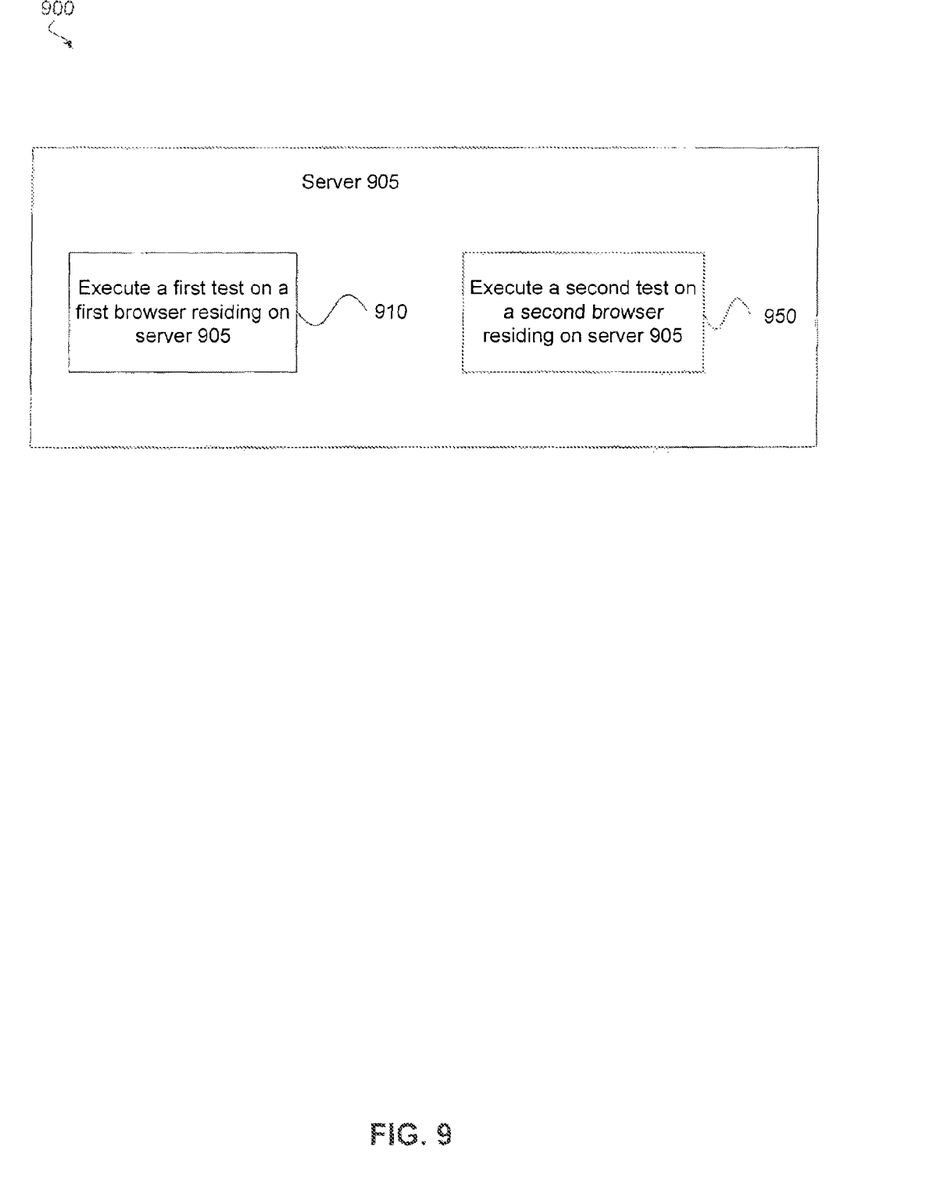
FIGS. 9-11 show flowcharts of an exemplary method for monitoring a web application, according to an embodiment
Figure 10:
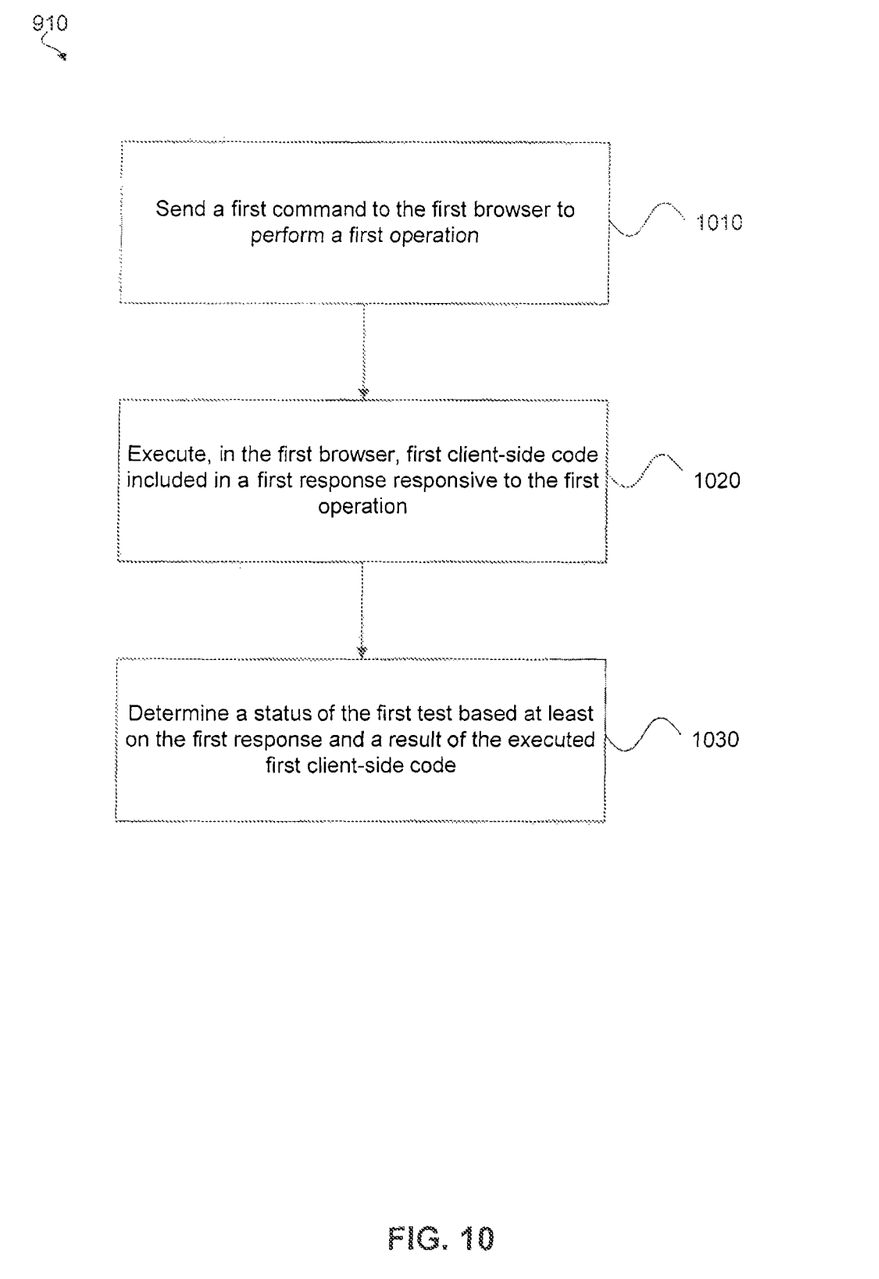
Figure 11:
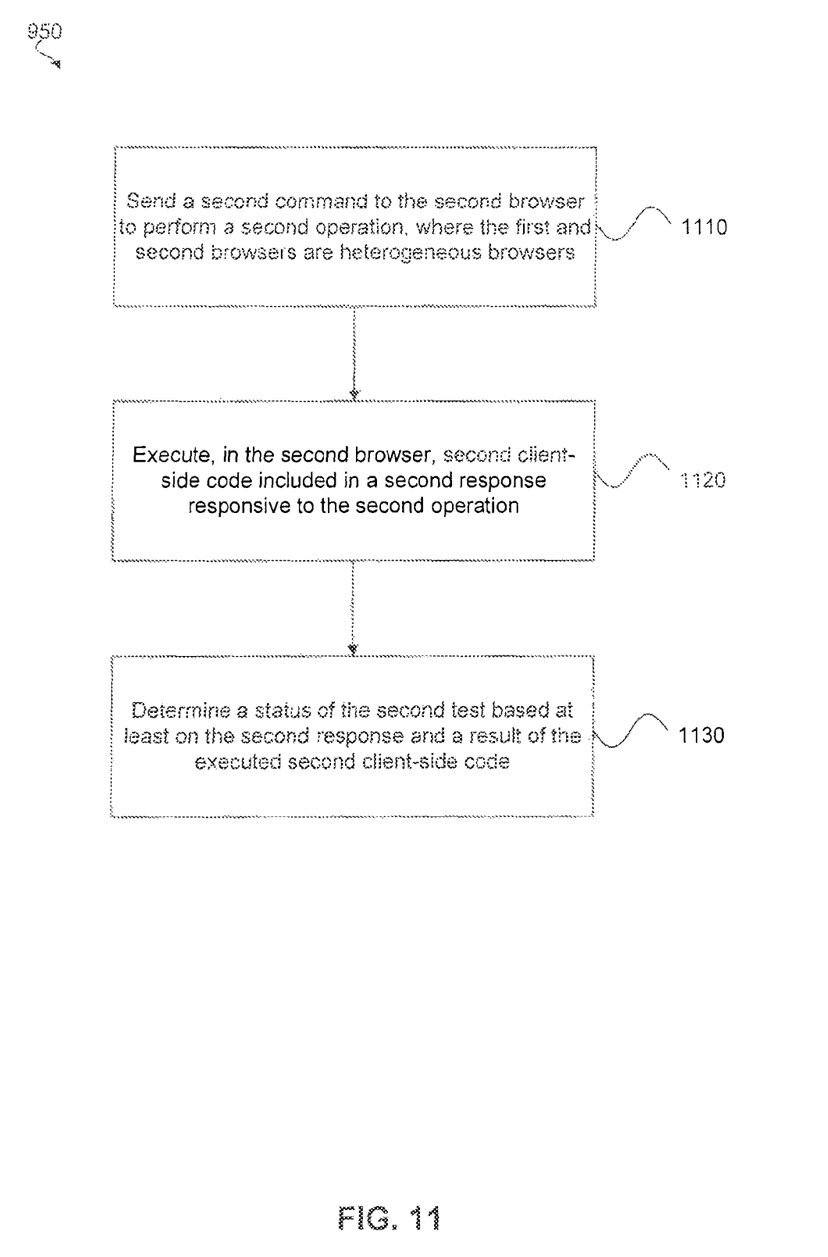

FIGS. 9-11 show flowcharts of an exemplary method for monitoring a web application, according to an embodiment.

In FIG. 9, at a stage 910, a first test is executed in a first browser residing on server 905. At a stage 950, a second test is executed in a second browser residing on server 905. In an embodiment, test executor 210 executes a first test in a first browser residing on a server and executes a second test in a second browser residing on the server.

FIG. 10 shows a flowchart of stage 910. At a stage 1010, a first command is sent to the first browser to perform a first operation. At a stage 1020, first client-side code included in a first response is executed in the first browser. The first response is responsive to the first operation. At stage 1030, a status of the first test is determined based at least on the first response and a result of the executed first client-side code. In an embodiment, test executor 210 sends a first command to first browser 155 to perform a first operation, first browser 155 executes first client-side code included in a first response responsive to the first operation, and test executor 210 determines a status of the first test based at least on the first response and a result of the executed first client-side code. First browser 155 may automatically execute the client-side code as a result of, for example, one or more previous commands relayed by command executor 250 or one or more commands sent to first browser 155 directly via the webdriver protocol.

FIG. 11 shows a flowchart of stage 950. At a stage 1110, a second command is sent to the second browser to perform a second operation. At a stage 1120, second client-side code included in a second response is executed in the second browser. The second response is responsive to the second operation. At stage 1130, a status of the second test is determined based at least on the second response and a result of the executed second client-side code. In an embodiment, test executor 210 sends a second command to second browser 160 to perform a second operation, second browser 160 executes second client-side code included in a second response responsive to the second operation, and test executor 210 determines a status of the second test based at least on the second response and a result of the executed second client-side code. Second browser 160 may automatically execute the client-side code as a result of, for example, one or more previous commands relayed by command executor 260 or one or more commands sent to second browser 160 directly via the webdriver protocol.

While method 900 is described with reference to systems 100 and 200, method 900 is not meant to be limiting and may be used in other applications.

VII. CONCLUSION

It is to be appreciated that the Detailed Description section, and not the Summary and Abstract sections, is intended to be used to interpret the claims. The Summary and Abstract sections may set forth one or more but not all exemplary embodiments as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A computer-implemented method for monitoring a web application, comprising:
executing a first test in a first browser residing on a server, wherein the first test is a first complete user session, the first complete user session comprising a first simulated sequence of user actions with a first user interface of the first browser during the first complete user session and wherein executing the first test comprises:
sending a first command to the first browser to perform a first user operation;
executing, in the first browser, first client-side code included in a first response responsive to the first user operation; and
determining a status of the first test based at least on the first response and a result of the executed first client-side code; and
executing a second test in a second browser residing on the server, the first and second browsers being heterogeneous browsers operating in heterogeneous browsing environments, wherein the second test is another complete user session, the another complete user session comprising a second simulated sequence of user actions with a second user interface of the second browser during the another complete user session and wherein executing the second test comprises:
sending a second command to the second browser to perform a second user operation;
executing, in the second browser, second client-side code included in a second response responsive to the second user operation; and
determining a status of the second test based at least on the second response and a result of the executed second client-side code.

2. The method of claim 1, wherein the first client-side code is Java Script code.

3. The method of claim 1, wherein the executing the first test comprises
sending, from a virtual machine residing on the server, a third command to the first browser to perform a third user operation, and
executing, in the first browser, third client-side code included in a third response responsive to the third user operation; and
the determining a status of the first test (a)(iii) comprises determining the status of the first test based at least on the third response and a result of the executed third client-side code, the first and third commands being associated with the first complete user session.

4. The method of claim 3, wherein a state of the third command is dependent on a state of the first command.

5. The method of claim 1, further comprising:
determining whether the first test has previously succeeded;
incrementing a first counter when it is determined that the first test has previously succeeded;
incrementing a second counter when it is determined that the first test has previously failed; and
generating an alert when the second counter exceeds a threshold.

6. The method of claim 1, further comprising:
determining whether the first test has previously failed; and
executing the first test automatically when it is determined that the first test has previously failed.

7. The method of claim 1, further comprising generating a log that includes metadata of the first test, wherein the metadata includes at least one of a status of the first test, a timestamp of the first test, a number of attempted test runs of the first test, a total time spent executing the first test, a number of times the first test has previously failed, or a number of times the first test has previously succeeded.

8. The method of claim 1, wherein the first browser runs on a first operating system, the second browser runs on a second operating system, and the first operating system is different from the second operating system.

9. A system for monitoring a web application, comprising:
a first server comprising:
a memory;
at least one processor coupled to the memory;
a test executor, implemented on the first server, and configured to:
execute a first test in a first browser residing on the first server, wherein the first test is a first complete user session, the first complete user session comprising a first simulated sequence of user actions with a first user interface of the first browser during the first complete user session,
execute a second test in a second browser residing on the first server, wherein the second test is another complete user session, the another complete user session comprising a second simulated sequence of user actions with a second user interface of the second browser during the another complete user session and wherein the first and second browsers are heterogeneous browsers,
send a first command to the first browser to perform a first user operation,
send a second command to the second browser to perform a second user operation,
determine a status of the first test based at least on the first response and a result of the executed first client-side code, and
determine a status of the second test based at least on the second response and a result of the executed second client-side code;
a first command executor, implemented on the first server, and configured to execute, in the first browser, first client-side code included in a first response responsive to the first user operation; and
a second command executor, implemented on the first server, and configured to execute, in the second browser, second client-side code included in a second response responsive to the second user operation.

10. The system of claim 9, further comprising a second server that comprises the test executor, first command executor, and second command executor.

11. The system of claim 9, wherein the first command executor resides in a first environment, the second command executor resides in a second environment, and the first environment is different from the second environment.

12. The system of claim 9, wherein the test executor resides in a first virtual machine and the second command executor resides in a second virtual machine.

13. The system of claim 9, wherein the first browser runs on a first operating system, the second browser runs on a second operating system, and the first operating system is different from the second operating system.

14. The system of claim 13, wherein the first browser is run natively on the first operating system.

15. The system of claim 9, further comprising a repository configured to store a list of previous test executions and metadata associated with the test executions.

16. The system of claim 9, wherein the first and second browsers run in a production environment.

17. The system of claim 9, further comprising a scheduler configured to coordinate test executions.

18. The system of claim 17, wherein the scheduler is configured to execute tests in a round robin scheduling algorithm.

19. A non-transitory computer readable storage medium having instructions encoded thereon that, when executed by a computing device, cause the computing device to perform operations comprising:
executing a first test in a first browser residing on a server, wherein the first test is a first complete user session, the first complete user session comprising a first simulated sequence of user actions with a first user interface of the first browser during the first complete user session and wherein executing the first test comprises:
sending a first command to the first browser to perform a first user operation;
executing, in the first browser, first client-side code included in a first response responsive to the first user operation; and
determining a status of the first test based at least on the first response and a result of the executed first client-side code; and
executing a second test in a second browser residing on the server, the first and second browsers being heterogeneous browsers operating in heterogeneous browsing environments, wherein the second test is another complete user session, the another complete user session comprising a second simulated sequence of user actions with a second user interface of the second browser during the another complete user session and wherein executing the second test comprises:
sending a second command to the second browser to perform a second user operation;
executing, in the second browser, second client-side code included in a second response responsive to the second user operation; and
determining a status of the second test based at least on the second response and a result of the executed second client-side code.

20. The non-transitory computer readable storage medium of claim 19, wherein the client-side code is Java Script code.

21. The non-transitory computer readable storage medium of claim 19, wherein the first browser runs on a first operating system, the second browser runs on a second operating system, and the first operating system is different from the second operating system.

* * * * *